United States Patent
Uden

(10) Patent No.: US 9,605,859 B2
(45) Date of Patent: Mar. 28, 2017

(54) AUTOMATED AIR SOURCE AND VAV BOX ASSOCIATION

(71) Applicant: Trane International Inc., Piscataway, NJ (US)

(72) Inventor: Dave Uden, St. Paul, MN (US)

(73) Assignee: Trane International Inc., Davidson, NC (US)

( * ) Notice: Subject to any disclaimer, the term of this patent is extended or adjusted under 35 U.S.C. 154(b) by 172 days.

(21) Appl. No.: 14/445,869

(22) Filed: Jul. 29, 2014

(65) Prior Publication Data

US 2015/0176853 A1    Jun. 25, 2015

Related U.S. Application Data

(63) Continuation of application No. 12/714,098, filed on Feb. 26, 2010, now Pat. No. 8,793,022.

(51) Int. Cl.
*F24F 11/00* (2006.01)
*G05B 15/02* (2006.01)
(Continued)

(52) U.S. Cl.
CPC ........ *F24F 11/006* (2013.01); *F24F 11/0009* (2013.01); *F24F 11/053* (2013.01);
(Continued)

(58) Field of Classification Search
CPC .... F24F 11/006; F24F 11/0009; F24F 11/053; F24F 2011/0056; G05B 15/02; G05D 23/1934
See application file for complete search history.

(56) References Cited

U.S. PATENT DOCUMENTS 4,086,781 A * 5/1978 Brody ............... F24F 11/04
165/250
5,251,815 A * 10/1993 Foye ............... G05D 7/0635
236/49.3
(Continued)

FOREIGN PATENT DOCUMENTS

CN    101427239 A    5/2009
CN    01589351 A    11/2009
(Continued)

OTHER PUBLICATIONS

"BACnet, LonWorks War Continues for BAS Manufacturers", p. 14, Mar. 10, 1997 Issue of Air Conditioning, Heating & Refrigerations News.
(Continued)

*Primary Examiner* — Ramesh Patel
(74) *Attorney, Agent, or Firm* — The Salerno Law Firm, P.C.

(57) ABSTRACT

A system and method including the ability of a building automation system controller to automatically determine which VAV boxes are physically associated with which air sources in a building or facility with multiple air sources by coordinating the individual or simultaneous manipulation of the fan speed of the air sources or the VAV damper positions, while obtaining data from networked sensors that measure VAV box airflow or duct pressure or the environmental conditions of a space being supplied with air from one or more VAV boxes.

16 Claims, 5 Drawing Sheets

(51) Int. Cl.
*F24F 11/053* (2006.01)
*G05D 23/19* (2006.01)
(52) U.S. Cl.
CPC ......... *G05B 15/02* (2013.01); *G05D 23/1934* (2013.01); *F24F 2011/0056* (2013.01)

(56) References Cited

U.S. PATENT DOCUMENTS

| | | | |
|---|---|---|---|
| 5,276,630 A | 1/1994 | Baldwin et al. | |
| 5,311,451 A | 5/1994 | Barrett | |
| 5,321,603 A | 6/1994 | Schwenke | |
| 5,341,988 A * | 8/1994 | Rein | G05D 23/1934 236/49.3 |
| 5,361,985 A | 11/1994 | Rein et al. | |
| 5,384,697 A | 1/1995 | Pascucci | |
| 5,390,206 A | 2/1995 | Rein et al. | |
| 5,444,851 A | 8/1995 | Woest | |
| 5,463,735 A | 10/1995 | Pascucci et al. | |
| 5,511,188 A | 4/1996 | Pascucci et al. | |
| 5,522,044 A | 5/1996 | Pascucci et al. | |
| 5,550,980 A | 8/1996 | Pascucci et al. | |
| 5,559,955 A | 9/1996 | Dev et al. | |
| 5,598,566 A | 1/1997 | Pascucci et al. | |
| 5,605,280 A | 2/1997 | Hartman | |
| 5,705,734 A | 1/1998 | Ahmed | |
| 5,761,432 A | 6/1998 | Bergholm et al. | |
| 5,805,442 A | 9/1998 | Crater et al. | |
| 5,884,072 A | 3/1999 | Rasmussen | |
| 5,982,362 A | 11/1999 | Crater et al. | |
| 5,999,179 A | 12/1999 | Kekic et al. | |
| 6,028,998 A | 2/2000 | Gloudeman et al. | |
| 6,067,477 A | 5/2000 | Wewalaarachchi et al. | |
| 6,098,116 A | 8/2000 | Nixon et al. | |
| 6,104,963 A | 8/2000 | Cebasek et al. | |
| 6,115,713 A | 9/2000 | Pascucci et al. | |
| 6,119,125 A | 9/2000 | Gloudeman et al. | |
| 6,141,595 A | 10/2000 | Gloudeman et al. | |
| 6,145,751 A | 11/2000 | Ahmed | |
| 6,148,355 A | 11/2000 | Mahalingam | |
| 6,154,681 A | 11/2000 | Drees et al. | |
| 6,157,943 A | 12/2000 | Meyer | |
| 6,167,316 A | 12/2000 | Gloudeman et al. | |
| 6,240,326 B1 | 5/2001 | Gloudeman et al. | |
| 6,241,156 B1 | 6/2001 | Kline et al. | |
| 6,263,387 B1 | 7/2001 | Chrabaszcz | |
| 6,266,726 B1 | 7/2001 | Nixon et al. | |
| 6,334,107 B1 | 12/2001 | Gale et al. | |
| 6,353,853 B1 | 3/2002 | Gravlin | |
| 6,389,331 B1 | 5/2002 | Jensen et al. | |
| 6,405,103 B1 | 6/2002 | Ryan et al. | |
| 6,487,457 B1 | 11/2002 | Hull et al. | |
| 6,496,893 B1 | 12/2002 | Arai | |
| 6,580,950 B1 | 6/2003 | Johnson et al. | |
| 6,584,095 B1 | 6/2003 | Jacobi et al. | |
| 6,584,096 B1 | 6/2003 | Allan | |
| 6,598,056 B1 | 7/2003 | Hull et al. | |
| 6,636,893 B1 | 10/2003 | Fong | |
| 6,708,505 B2 | 3/2004 | Nakamura et al. | |
| 6,714,977 B1 | 3/2004 | Fowler et al. | |
| 6,832,120 B1 | 12/2004 | Frank et al. | |
| 6,834,298 B1 | 12/2004 | Singer et al. | |
| 6,925,571 B1 | 8/2005 | Motoyama et al. | |
| 6,964,174 B2 | 11/2005 | Shah | |
| 6,999,824 B2 | 2/2006 | Glanzer et al. | |
| 7,010,796 B1 | 3/2006 | Strom et al. | |
| 7,017,827 B2 | 3/2006 | Shah et al. | |
| 7,031,880 B1 * | 4/2006 | Seem | G05B 23/0232 700/174 |
| 7,065,769 B1 | 6/2006 | Tolopka | |
| 7,080,142 B2 | 7/2006 | Galloway et al. | |
| 7,136,914 B2 | 11/2006 | Motoyama | |
| 7,165,109 B2 | 1/2007 | Chiloyan et al. | |
| 7,177,776 B2 * | 2/2007 | Whitehead | F24F 11/006 702/118 |
| 7,194,537 B2 | 3/2007 | Motoyama et al. | |
| 7,206,791 B2 | 4/2007 | Hind et al. | |
| 7,240,106 B2 | 7/2007 | Cochran et al. | |
| 7,246,162 B2 | 7/2007 | Tindal | |
| 7,249,170 B2 | 7/2007 | Tindal et al. | |
| 7,250,856 B2 | 7/2007 | Havekost et al. | |
| 7,251,534 B2 | 7/2007 | Walls et al. | |
| 7,275,079 B2 | 9/2007 | Brodsky et al. | |
| 7,287,085 B1 | 10/2007 | Motoyama et al. | |
| 7,287,257 B2 | 10/2007 | Meza | |
| 7,289,995 B2 | 10/2007 | Motoyama et al. | |
| 7,293,253 B1 | 11/2007 | Soukup | |
| 7,296,079 B2 | 11/2007 | Motoyama et al. | |
| 7,302,469 B2 | 11/2007 | Motoyama et al. | |
| 7,320,023 B2 | 1/2008 | Chintalapati et al. | |
| 7,337,242 B1 | 2/2008 | Motoyama et al. | |
| 7,349,761 B1 | 3/2008 | Cruse | |
| 7,392,310 B2 | 6/2008 | Motoyama et al. | |
| 7,421,474 B2 | 9/2008 | Motoyama et al. | |
| 7,433,740 B2 | 10/2008 | Hesse et al. | |
| 7,437,452 B2 | 10/2008 | Motoyama | |
| 7,437,596 B2 | 10/2008 | McFarland | |
| 7,447,766 B2 | 11/2008 | Motoyama et al. | |
| 7,500,003 B2 | 3/2009 | Motoyama et al. | |
| 7,502,848 B2 | 3/2009 | Motoyama et al. | |
| 7,506,048 B1 | 3/2009 | Motoyama | |
| 7,512,450 B2 | 3/2009 | Ahmed | |
| 7,519,698 B2 | 4/2009 | Motoyama | |
| 7,533,167 B2 | 5/2009 | Motoyama et al. | |
| 7,533,333 B2 | 5/2009 | Motoyama et al. | |
| 7,536,450 B2 | 5/2009 | Motoyama et al. | |
| 7,551,983 B2 * | 6/2009 | Attridge, Jr. | F24F 3/0442 165/217 |
| 7,574,503 B2 | 8/2009 | Motoyama et al. | |
| 7,606,894 B2 | 10/2009 | Motoyama et al. | |
| 7,610,372 B2 | 10/2009 | Motoyama et al. | |
| 7,610,374 B2 | 10/2009 | Motoyama et al. | |
| 7,634,555 B1 | 12/2009 | Wainscott, Jr. et al. | |
| 7,647,397 B2 | 1/2010 | Motoyama et al. | |
| 7,729,882 B2 * | 6/2010 | Seem | G05B 23/024 700/276 |
| 7,765,289 B2 | 7/2010 | Park | |
| 7,765,826 B2 | 8/2010 | Nichols | |
| 7,870,090 B2 | 1/2011 | McCoy et al. | |
| 7,904,186 B2 | 3/2011 | Mairs et al. | |
| 7,917,232 B2 * | 3/2011 | McCoy | H04L 41/22 700/17 |
| 8,024,054 B2 | 9/2011 | Mairs et al. | |
| 8,050,801 B2 | 11/2011 | Richards et al. | |
| 8,055,386 B2 | 11/2011 | McCoy et al. | |
| 8,055,387 B2 | 11/2011 | McCoy et al. | |
| 8,099,178 B2 | 1/2012 | Mairs et al. | |
| 8,180,824 B2 | 5/2012 | McCoy et al. | |
| 8,219,660 B2 | 7/2012 | McCoy et al. | |
| 8,290,627 B2 | 10/2012 | Richards et al. | |
| 8,635,338 B2 | 1/2014 | McCoy et al. | |
| 8,793,022 B2 * | 7/2014 | Uden | F24F 11/0009 236/49.3 |
| 2002/0016639 A1 | 2/2002 | Smith et al. | |
| 2002/0029096 A1 | 3/2002 | Takai et al. | |
| 2002/0042845 A1 | 4/2002 | Burmann et al. | |
| 2002/0136203 A1 | 9/2002 | Liva et al. | |
| 2002/0152028 A1 | 10/2002 | Motoyama et al. | |
| 2002/0152292 A1 | 10/2002 | Motoyama et al. | |
| 2003/0084176 A1 | 5/2003 | Tewari et al. | |
| 2003/0135765 A1 | 7/2003 | Hind et al. | |
| 2003/0158975 A1 | 8/2003 | Frank et al. | |
| 2003/0159129 A1 | 8/2003 | Frank et al. | |
| 2003/0167323 A1 | 9/2003 | Motoyama et al. | |
| 2004/0059808 A1 | 3/2004 | Galloway et al. | |
| 2004/0075549 A1 | 4/2004 | Haller | |
| 2004/0143510 A1 | 7/2004 | Haeberle et al. | |
| 2004/0148288 A1 | 7/2004 | Haeberle et al. | |
| 2004/0215694 A1 | 10/2004 | Podolsky | |
| 2004/0215740 A1 | 10/2004 | Frank et al. | |
| 2004/0230323 A1 | 11/2004 | Glanzer et al. | |
| 2004/0243988 A1 | 12/2004 | Ota | |
| 2004/0249597 A1 * | 12/2004 | Whitehead | F24F 11/006 702/118 |
| 2004/0249913 A1 | 12/2004 | Kaufman | |

(56) References Cited

U.S. PATENT DOCUMENTS

| | | |
|---|---|---|
| 2004/0254915 A1 | 12/2004 | Motoyama et al. |
| 2004/0255023 A1 | 12/2004 | Motoyama et al. |
| 2005/0071483 A1 | 3/2005 | Motoyama |
| 2005/0090915 A1 | 4/2005 | Geiwitz |
| 2005/0177642 A1 | 8/2005 | Motoyama et al. |
| 2006/0010232 A1 | 1/2006 | Page et al. |
| 2006/0047787 A1 | 3/2006 | Agarwal et al. |
| 2006/0058923 A1 | 3/2006 | Kruk et al. |
| 2006/0091227 A1* | 5/2006 | Attridge, Jr. ......... F24F 3/0442 236/1 B |
| 2006/0130107 A1 | 6/2006 | Gonder et al. |
| 2006/0155824 A1 | 7/2006 | Motoyama et al. |
| 2006/0184659 A1 | 8/2006 | Motoyama et al. |
| 2007/0005736 A1 | 1/2007 | Hansen et al. |
| 2007/0043476 A1 | 2/2007 | Richards et al. |
| 2007/0055698 A1 | 3/2007 | McCoy et al. |
| 2007/0055756 A1 | 3/2007 | Richards et al. |
| 2007/0055757 A1 | 3/2007 | Mairs et al. |
| 2007/0055758 A1 | 3/2007 | McCoy et al. |
| 2007/0055759 A1 | 3/2007 | McCoy et al. |
| 2007/0055760 A1* | 3/2007 | McCoy ................... H04L 41/22 709/223 |
| 2007/0061046 A1 | 3/2007 | Mairs et al. |
| 2007/0067062 A1 | 3/2007 | Mairs et al. |
| 2007/0261062 A1 | 11/2007 | Bansal et al. |
| 2008/0164006 A1* | 7/2008 | Karamanos ........... F24F 1/0059 165/67 |
| 2008/0183424 A1* | 7/2008 | Seem ................... G05B 23/024 702/181 |
| 2008/0281472 A1 | 11/2008 | Podgorny et al. |
| 2009/0083416 A1 | 3/2009 | Nass et al. |
| 2009/0144023 A1* | 6/2009 | Seem ................... G05B 23/024 702/181 |
| 2010/0106332 A1* | 4/2010 | Chassin ................ G06Q 20/102 700/278 |
| 2010/0228805 A1 | 9/2010 | McCoy et al. |
| 2011/0047259 A1 | 2/2011 | Sato et al. |
| 2011/0047418 A1 | 2/2011 | Drees et al. |
| 2011/0131336 A1 | 6/2011 | Wang et al. |
| 2011/0208803 A1 | 8/2011 | McCoy et al. |
| 2011/0213502 A1 | 9/2011 | Uden |
| 2011/0213867 A1 | 9/2011 | McCoy et al. |
| 2012/0109383 A1 | 5/2012 | Richards et al. |
| 2012/0215759 A1 | 8/2012 | McCoy et al. |

FOREIGN PATENT DOCUMENTS

| | | |
|---|---|---|
| CN | 101632050 A | 1/2010 |
| GB | 2444451 A | 6/2008 |
| GB | 2445489 A | 7/2008 |
| GB | 2445686 A | 7/2008 |
| GB | 2465506 A | 5/2010 |
| WO | 2007/024573 A2 | 3/2007 |
| WO | 2007/024622 A2 | 3/2007 |
| WO | 2007/024623 A2 | 3/2007 |
| WO | 2010/096313 A2 | 8/2010 |

OTHER PUBLICATIONS

"Controls Companies See Opportunities on Internet", Mar. 1, 1997 Issue of Energy User News.

Tracer Summit Web Server, Dated Mar. 2003, Document No. BAS-PRC014-EN.

"Infinity WebServer" brochure, Copyright 1997 by Andover Controls Corporation, Document No. DS-WEBSVR-A.

"Facility Management Unleashed: web.Client", Copyright 2002 by Andover Controls, Document No. BR-WC-A.

"Building Automation Systems on the Internet", by Albert T.P. So, W.L. Chan and W.L. Tse, May/Jun. 1997 Issue of Facilities Magazine, vol. 15, No. 5/6, pp. 125-133.

"Connecting LonWorks and TCP/IP Enterprise Networks-Real Application Successes", by Coactive Aesthetics, dated 1997.

"Remote Building Monitoring and Control", an ACEEE paper, dated Jul. 18, 1996.

Remote Building Control Using the Internet,: by Edward Finch, Dec. 1998 Issue of Facilities Magazine, vol. 15-No. 12/13, pp. 356-360.

"Marketing Tracer Summit", a marketing guide dated Jan. 1998, Order No. BAS-MG-46.

"Tracer Summit Users Network", a marketing guide dated Mar. 2002, Order No. BAS-SLM005-EN.

"Marketing the Tracer ZN.511 and ZN.521 Zone Controllers", a marketing guide dated Feb. 2001, Order No. BAS-SLM008-EN.

http://www.nettedautomation.com/glossary_menue/glossy_r. html—The Net is the Automation, Netted Automation GmbH, Information and Communication Systems (NAICS), 2000-2002, composed by John Black, Web page—http://www.nettedautomation.com/glossary_menue/glossy_r.html, printed Jan. 20, 2008.

"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7; http://research.microsoft.com/~cszypers/events/WCOP2002/10_Gal.pdf.

Microsoft Computer Dictionary, Fifth Edition, "Server" definition, Published: 2002, Publisher: Microsoft Press, p. 474.

PersonalSCADA 2.0 User's Guide, Eutech Cybernetics Pte Ltd., 2002.

"Tracer Summit, Building Automation System," TRANE, Doc #BAS-PRC001-EN, Aug. 2002.

Enterprise Buildings Integrator R310, Specification Data, Honeywell, Mar. 2003.

* cited by examiner

AUTOMATED AIR SOURCE AND VAV BOX ASSOCIATION

RELATED APPLICATION

This application is a continuation of application Ser. No. 12/714,098 filed Feb. 26, 2010, now U.S. Pat. No. 8,793,022 issued Jul. 29, 2014, which is hereby fully incorporated herein by reference.

FIELD OF THE INVENTION

The present invention relates to systems and methods of installing, configuring, and controlling various HVAC systems used to condition structures through the use of a building automation and control system. Specifically, the mapping or association of variable air-volume control elements located throughout a structure to any associated sources of conditioned airflow.

BACKGROUND OF THE INVENTION

Building automation systems (BAS) are used to coordinate, manage, and automate control of diverse environmental, physical, and electrical building subsystems, particularly HVAC and climate control but also including security, lighting, power, and the like. One example of a building automation system and architecture that provides an intelligent control system via a dynamically extensible and automatically configurable architecture is disclosed in U.S. Publication No. 2007/0055760, of common assignee with the present application.

One common element in many BAS installations are variable air-volume (VAV) elements that typically include one or more air sources and air distribution boxes, also known as VAV boxes, that are used to supply only as much conditioned air to a space as is necessary to maintain the desired environmental conditions in that space. A large building or campus can contain multiple air sources that deliver air to multiple VAV boxes that in turn control the air flow to individual spaces in a given building. For many reasons, one of which being the simple variance in size or volume of each space to be conditioned, it is necessary to configure or balance the amount of air each VAV box provides to an assigned space. Balancing the system to provide the appropriate amount of airflow can help to improve the efficiency of the building's environmental controls as well as maintain the comfort of any occupants of the space. While balancing a VAV system with a single air source and a few associated VAV boxes is relatively straightforward, the complexity of the task increases substantially when multiple air sources are tied to multiple VAV boxes in a large system. Even though the relationship between each individual VAV box and its corresponding air source in a multi-air-source building may be clearly depicted in a building's design documents, transferring those relationships into a digital BAS environment requires laborious programming or data entry that is subject to human error as well as discrepancies that may exist between the design documents and the actual building configuration and wiring.

A variety of techniques exist for balancing VAV boxes and air sources. Examples include those described in U.S. Pat. Nos. 5,251,815 and 5,341,988, each having a common assignee with the present application. Another discussion of a variable air-volume balancing system is disclosed in U.S. Pat. No. 5,605,280 to Hartman. However, even with these techniques, fully configuring a large system is still generally a labor-intensive task that varies with each system implementation, and requires the manual programming or association of VAV boxes to each air source. In the case of multiple air sources that supply multiple VAV boxes in a multi-space building the associated relationships can become even more complex and require additional efforts to achieve the proper balance in the system. Upgrading, expanding, and updating or removing VAV system components are also complex tasks, as the existing BAS must be reconfigured and rebalanced to recognize and incorporate any changes.

Accordingly, a need remains for an intelligent BAS having the capability to automatically map and associate the various VAV boxes located in a structure with multiple air sources providing conditioned air to that structure.

SUMMARY OF THE INVENTION

The present invention substantially addresses the above-identified needs by providing a system and method that integrates multiple air sources, or VAV boxes, their associated controls and environmental sensors with a BAS controller that can determine an association of VAV boxes with one or more individual air sources. This association can facilitate the automatic balancing of the airflow each VAV box provides to an installed space that can also have an association with one or more VAV boxes in another embodiment.

When a single air source feeds multiple VAV boxes the system can be represented in a one-to-many association or relationship. Multiple air sources can also be routed through a common set of ducts resulting in a system with a many-to-many relationship between air sources and VAV boxes.

An embodiment of the invention includes systems and methods for determining the airflow relationship between one or more air sources and a plurality of VAV boxes connected to a BAS controller. The BAS determines the associations by operating the BAS system in a range of configurations that can include utilizing individual air sources across a range of airflow settings and cycling each of the VAV boxes, such that a determination can be made either by monitoring a sensor associated with the VAV box, a duct pressure sensor, or an environmental monitor or sensor positioned in a space supplied by air that passes through one or more VAV boxes. The BAS controller is communicatively coupled to each of the air sources, VAV boxes, and any monitors or sensors allowing changes recorded by the sensors to be correlated to the actuation of an individual air box or the increase or decrease in the speed or flow rate of one or more air sources. The correlation between sensor changes and component actuation provides the BAS controller with evidence of the relationship between the various components allowing a determination of what elements should be associated with each other.

For example, instead of a field technician manually programming and associating each VAV box with the air source providing it with conditioned air, a BAS controller such as the TRACER SC controller, which is available from Trane International Inc., manipulates the fan speed of the air source and the position of the damper in the VAV boxes while monitoring the pressure in the ducts and the airflow through those VAV boxes. When any particular air source starts or changes, associated duct pressure sensors and VAV airflow sensors will register a change. Similarly, when the air source is held to a constant speed, opening and closing individual VAV dampers will be detected by variations in the duct pressure for that duct system. By interactively repeating these processes for all air sources in a HVAC system each air source can be associated with the VAV boxes in its duct system.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The embodiments of the present invention may be more completely understood in consideration of the following detailed description of various embodiments in connection with the accompanying drawings, in which.

Figure 1:
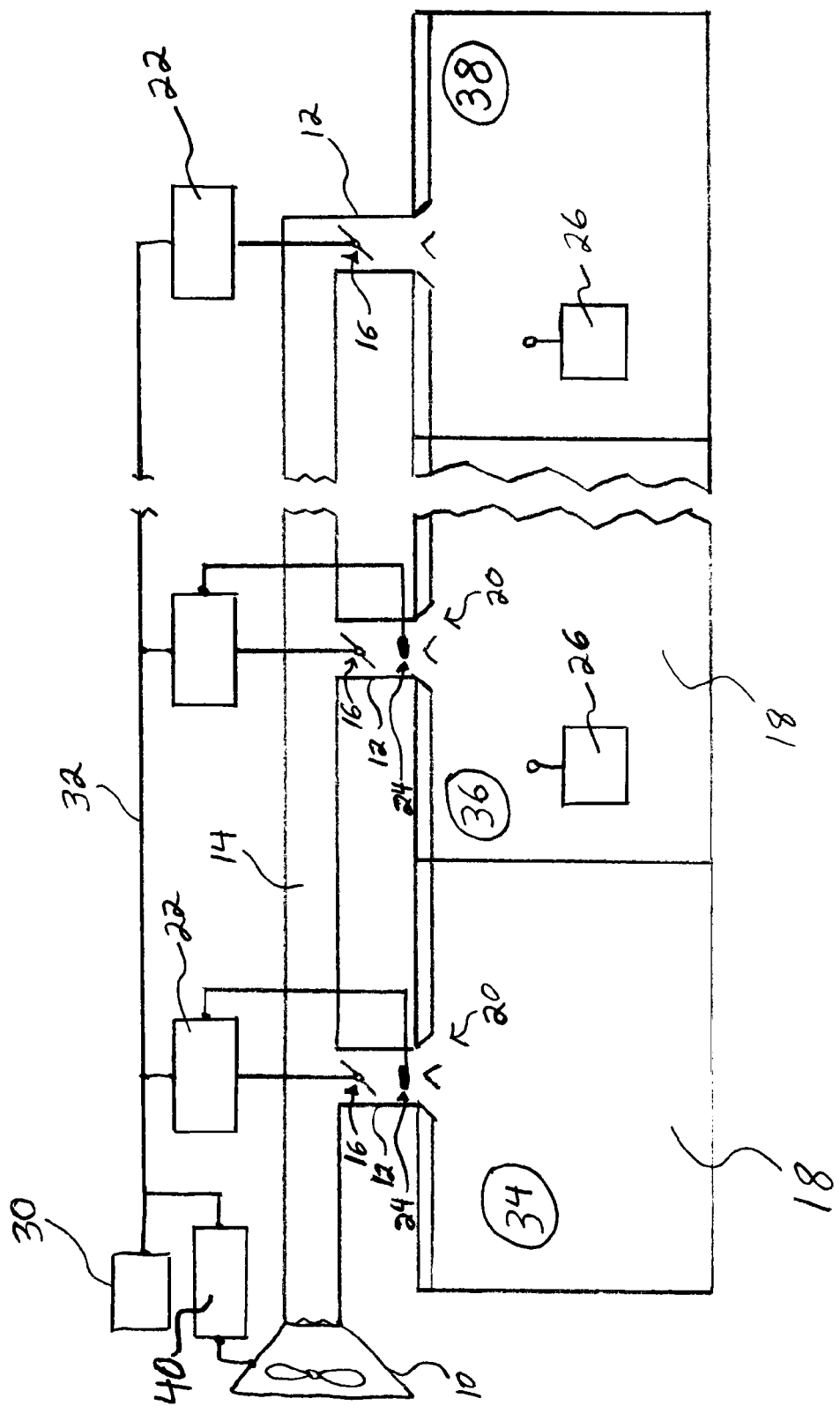
FIG. 1 is a schematic depiction of a system with a single air source and multiple VAV boxes.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE INVENTION

The systems and methods of the invention can be utilized in a local or widely distributed building automation system (BAS), from a space or building level to an enterprise level, encompassing virtually any structure, cluster, campus, and area in between. The systems and methods are particularly suited for a dynamically extensible and automatically configurable BAS and architecture, such as those disclosed in U.S. patent application Ser. No. 11/208,773, now U.S. Pat. No. 8,050,801, filed Aug. 22, 2005, entitled "Dynamically Extensible and Automatically Configurable Building Automation System and Architecture"; U.S. patent application Ser. No. 11/316,687, now U.S. Pat. No. 8,099,178, filed Dec. 22, 2005, entitled "Building Automation System Facilitating User Customization"; U.S. patent application Ser. No. 11/316,699, now U.S. Pat. No. 7,904,186, filed Dec. 22, 2005, entitled "Building Automation System Facilitating User Customization"; U.S. patent application Ser. No. 11/316,702, now U.S. Pat. No. 8,024,054, filed Dec. 22, 2005, entitled "Building Automation System Facilitating User Customization"; U.S. patent application Ser. No. 11/316,695, now U.S. Pat. No. 7,870,090, filed Dec. 22, 2005, entitled "Building Automation System Data Management"; U.S. patent application Ser. No. 11/316,697, now U.S. Pat. No. 8,055,386, filed Dec. 22, 2005, entitled "Building Automation System Data Management"; U.S. patent application Ser. No. 11/316,698, now U.S. Pat. No. 8,055,387, filed Dec. 22, 2005, entitled "Building Automation System Data Management"; U.S. patent application Ser. No. 11/316,703, now U.S. Pat. No. 7,917,232, filed Dec. 22, 2005, entitled "Building Automation System Data Management"; and U.S. patent application Ser. No. 11/316,410, now U.S. Pat. No. 8,290,627, filed Dec. 22, 2005, entitled "Dynamically Extensible and Automatically Configurable Building Automation System and Architecture," all of which are assigned to the assignee of the claimed inventions, and are herein incorporated by reference.

A typical structure equipped with a BAS configured to control a single air source 10 supplying conditioned air to multiple VAV boxes 12 though a duct 14 is depicted in FIG. 1. A VAV box 12 can include one or more dampers 16 to regulated the flow of air from a duct 14 or conduit into an associated space 18 through a diffuser 20. Dampers 16 can be actuated by a control mechanism 22 associated with each VAV box 12 in response to changes detected by one or more sensors 24 located either in or near the VAV box 12 itself such as air flow rates, duct pressure monitors, or to environmental monitors 26 such as thermometers, thermostats, humidity sensors or other devices located in the space 18 being supplied with conditioned air through the VAV box 12.

An exemplary control mechanism 22 for a VAV box can include a circuit configured to drive a solenoid capable of either fully opening or closing a damper 16 located in the VAV box 12 depending on the presence or absence of an electrical signal. Alternatively, the control mechanism 22 can include a more advanced programmable logic controller (PLC) capable of communicating through a network or dedicated communication link with the BAS controller 30. The control mechanism 22 can preferably adjust the position of the damper 16 with a stepper motor, or other appropriate actuator, to any of a plurality of positions between fully closed and fully open in response to commands from the BAS controller 30. Alternatively, the control mechanism 22 can adjust the damper 16 based on a comparison of measurements provided by one or more sensors 24, coupled to the control mechanism 22, and reference values provided to the control mechanism by the BAS controller 30.

The various sensors 24 and monitors 26, as well as the control mechanisms 22, can be connected to a central BAS controller 30 in a variety of ways, including wired or wireless networks 32 employing one or more networking protocols. FIG. 1 depicts a structure employing a combination of both wired and wireless components. First space 34 includes a wired sensor 24 located proximate to the VAV box 12. Second space 36 includes both a wired sensor 24 proximate to the VAV box and a wireless environmental monitor 26 installed in the second space 36. Third space 38 include a wireless environmental monitor 26 but is not equipped with a VAV box sensor. The wired sensor 24 that is located internally to VAV box 12 that can be configured as being responsible for monitoring space 34. Second space 36 and third space 38 present illustrations where the wireless environmental monitors 26 can also monitor an individual space either alone or in conjunction with a wired sensor 24.

In second space 36, the only relationship between the VAV box 12 and the environmental sensor 26 is their physical association with the second space 36. While it may be intuitive to the human eye that these two elements are related when viewed in FIG. 1, the relationship is not immediately clear to a central BAS controller 30 that is only able to view the VAV box 12 and the environmental sensor 26 as simply two of a potentially very large number of discrete components connected to the system. In a system with only a single air source 10 and air-source controller 40, the association between the air-source 10 and each of the VAV boxes 12 is straightforward as only a single air source can be associated with each of the VAV boxes 12. As discussed below this relationship becomes more complex when multiple air sources and their associated controllers are coupled to a BAS controller 30.

One embodiment of the invention can enable a BAS controller 30 to automatically determine the relationship between a VAV box 12 and any appropriate environmental monitors 26 located in the space served by the VAV box 12. This feature can greatly reduce the amount of effort required to configure and balance BAS installations as it helps to reduce or eliminate the amount of space descriptive data that must be manually entered into the system as well as potentially overcoming errors introduced during the construction or HVAC installation process such as mislabeled or improperly configured wiring between components.

Figure 2:
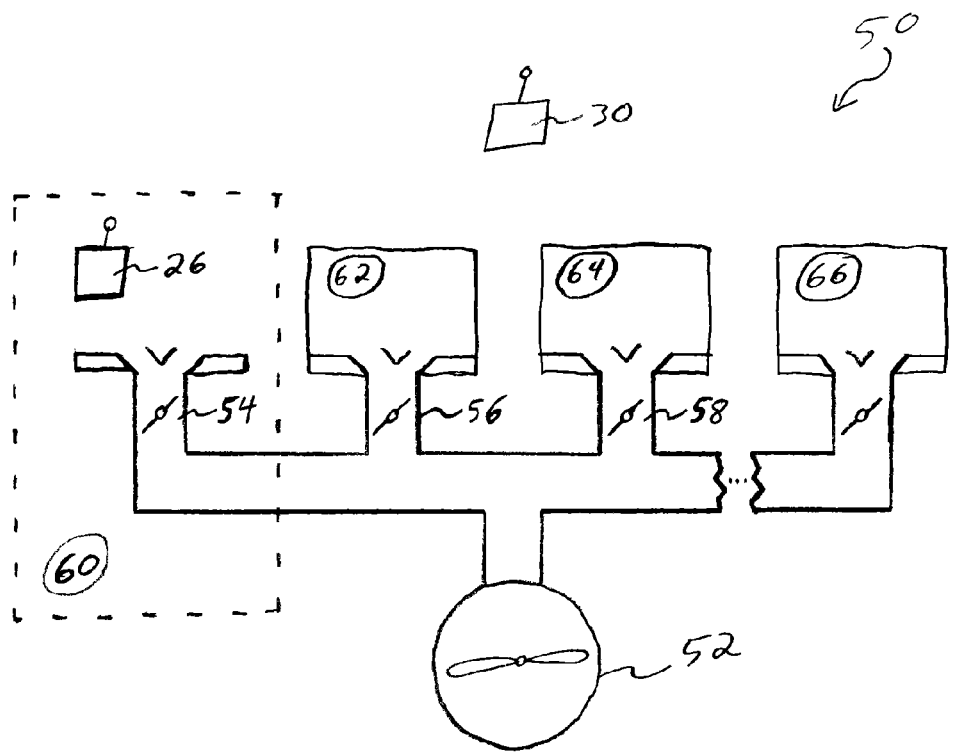
FIG. 2 is a schematic depiction of a second system with a single air source and multiple VAV boxes.

FIG. 2 depicts a space configuration 50 where a single air source 52 supplies conditioned air to multiple VAV boxes (54 56 58). Each individual VAV box in turn supplies a single space (60 62 64 66). Because there is only a single air source 52 the relationship between each of VAV boxes and the air source 52 is clear. Balancing of each VAV boxes can then be performed to configure the setting for each space. The automatic association of an individual VAV box 54 to a specific space is possible when a space 60 is equipped with environmental monitor 26 and the location of that monitor 26 is provided to the BAS controller 30 that is in wireless communication with the monitor 26. It is understood that other network or communication links between the BAS controller 30 and the other components of the system can be included, however they are not shown here for clarity. During the balancing process, either immediately upon installation or at a later time, the BAS controller 30 can be configured to observe the changing condition of the space 60 based on data provided by environmental monitor 26 and correlate those changes to any adjustment in the amount of conditioned air based on the settings of the air supply 52 and VAV box 54 that would have a high likelihood of affecting the monitored condition in the space 60.

Figure 3:
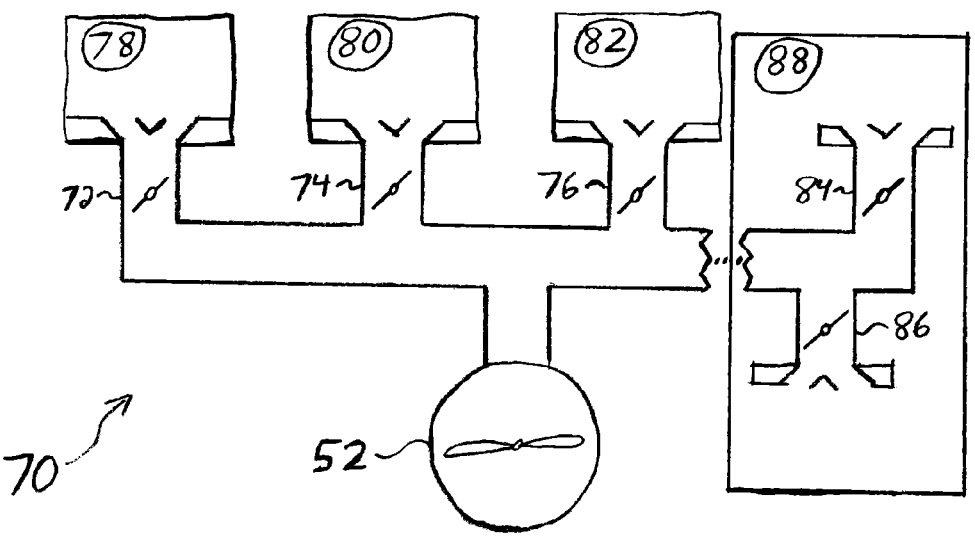
FIG. 3 is a schematic depiction of a system with multiple VAV boxes associated with a single space.

FIG. 3 presents a space configuration 70 where three separate VAV boxes (72 74 76) are associated with individual spaces (78 80 82) respectively and at least two VAV boxes (84 86) are providing conditioned air to a single space 88. In this example, an embodiment of the invention can determine that two VAV boxes (84 86) are supplying a single space 88 based on a variety of conditions. The first possibility as discussed above would be the presence of an environmental sensor such as a digital thermometer in the space 88 that would provide temperature feedback to the BAS continuously or at periodic intervals. For example, if the BAS first correlates the first VAV box 84 with the space 88 by supplying a maximum amount of cool air into the space 88 and observing a drop in temperature as reported by the digital thermometer, and then detects that when the second VAV box 86 is also actuated from a closed to an open position the temperature in the space 88 drops further, or at a faster rate over an appropriate period of time. In this example the BAS controller can recognize each VAV box as having a "soft" association with the space and neither VAV box individually has a "hard" association that clearly indicates a one-to-one relationship between the VAV box settings and the conditions of the space. The BAS controller can recognize that further automated tests may be necessary to ascertain the full relationship between the VAV boxes (84 86) and the space 88 in order to rule out any external factors that could be causing the change in temperature in the space 88. The further tests could include similar testing over a longer period of time or alternating the various configurations of the two VAV boxes (84 86) and confirming that the changes to the environmental condition of the space 88 match or correlate to what the BAS is programmed to expect to happen based on the changes in VAV box or air source 52 settings.

Alternatively, the BAS system can monitor the airflow and duct pressure associated with the VAV boxes (84 86). A space 88 that is supplied with conditioned air from multiple VAV boxes can produce different feedback characteristics in air pressure and flow rates than a similar space that is only supplied by a single VAV box. For example, if the two VAV boxes (84 86) are initially configured in the fully-closed position, pressure and flow measurements are acquired by sensors located in the VAV boxes or nearby ducts by the BAS, and then a single first VAV box 84 is transitioned to the half-open position, and the pressure and flow measurements are reacquired a baseline condition is established. If the first VAV box 84 is transitioned back to the fully-closed position and the second VAV box 86 is transitioned to the half-open position, and the pressure and flow measurements are reacquired a second baseline condition is established. If these two baseline conditions are nearly identical it can indicate to the BAS controller that either the two VAV boxes are supplying nearly identical spaces, or that the two VAV boxes could be supplying conditioned air to the same space. This question can be resolved by transitioning both VAV boxes (84 86) into the half-open position where the initial baselines were established and reacquiring the pressure and flow measurements. Absent other external factors, these reacquired measurements will vary from the original baseline measurements due to the doubling of the amount of conditioned air supplied to the space when both VAV boxes (84 86) are opened, indicating a high likelihood that both VAV boxes (84 86) are associated with the same individual space 88.

The association of two VAV boxes (84 86) with a single space 88 can also be determined or verified in conjunction with the above procedure by correlating a change in flow rate or duct pressure measured at a first VAV box 84 in the open position when a second VAV box 86 is transitioned to the open position. While these measurements can change even if two VAV boxes with a common air source 52 are supplying conditioned air to two separate spaces one skilled in the appropriate art will appreciate that the changes in these measurements will vary based on whether or not the two VAV boxes are associated with the same or with different spaces. The observation of these two distinct data measurement profiles can provide a further indication to a BAS controller what actual relationship exists between the various VAV system components.

Figure 4:
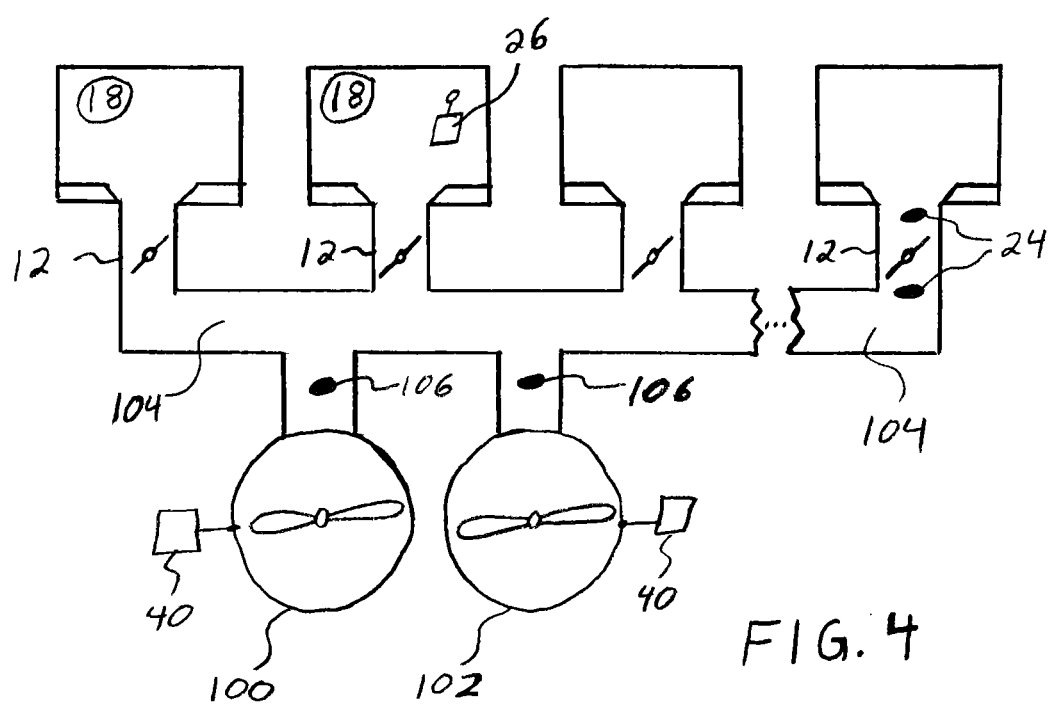
FIG. 4 is a schematic depiction of a system with multiple air sources.

FIG. 4 depicts a configuration where multiple spaces 18, VAV boxes 12, and air sources (100 102) are present. In this example embodiment a first air source 100 and a second air source 102 supply air through a duct system 104 to a plurality of VAV boxes 12. Each VAV box 12 is associated with an individual space 18. Unlike the examples above, the presence of more than one air source creates an additional variable for the BAS controller to correlate. The BAS controller can utilize the feedback techniques from any environmental monitors 26 located in the individual spaces or any airflow or pressure sensors 24 associated with the VAV boxes 12, in addition to any data available from the air source controller 40 such as fan speed, air pressure, flow rates, or other air handling capacity data to determine the relationship between the air sources (100 102) and the VAV boxes 12. As with the earlier examples, the relationship may appear clear on paper to the human eye but the BAS controller can only determine whether it is connected to a system with two air sources that share a common duct path to multiple air VAV boxes as show in FIG. 4, or a system with two separate air sources connected by separate ducts path to multiple air VAV boxes, by taking multiple measurements with the system configured in a variety of operating settings and correlating the results. In a single structure equipped as if both the systems of FIG. 2 and FIG. 3 were present with separate duct paths between two air sources and the VAV boxes, where all the components were coupled to a single BAS controller, the BAS controller can first operate one air source while the other is off and observe that only a subset of the sensors or monitors near each of the VAV boxes records the change due to the operation of the first air source. A similar test performed with the second air source can confirm the results obtained from the first air source and also highlight any VAV boxes that returned anomalous results after all air sources have been cycled.

Returning to FIG. 4, in addition to being able to manipulate the position of the VAV box 12 damper positions a properly configured BAS can also manipulate the fan speed of any air sources (100 102) to which it is connected. By monitoring the airflow through each VAV box with sensors 24, and the duct pressure in the ducts connecting each air source to one or more VAV boxes with pressure sensors 106, the BAS controller can determine how each of the VAV boxes in a structure are physically connected to one or more air sources (100 102). This capability reduces the need for time consuming and error prone manual programming of the associations by field service technicians.

Figure 5:
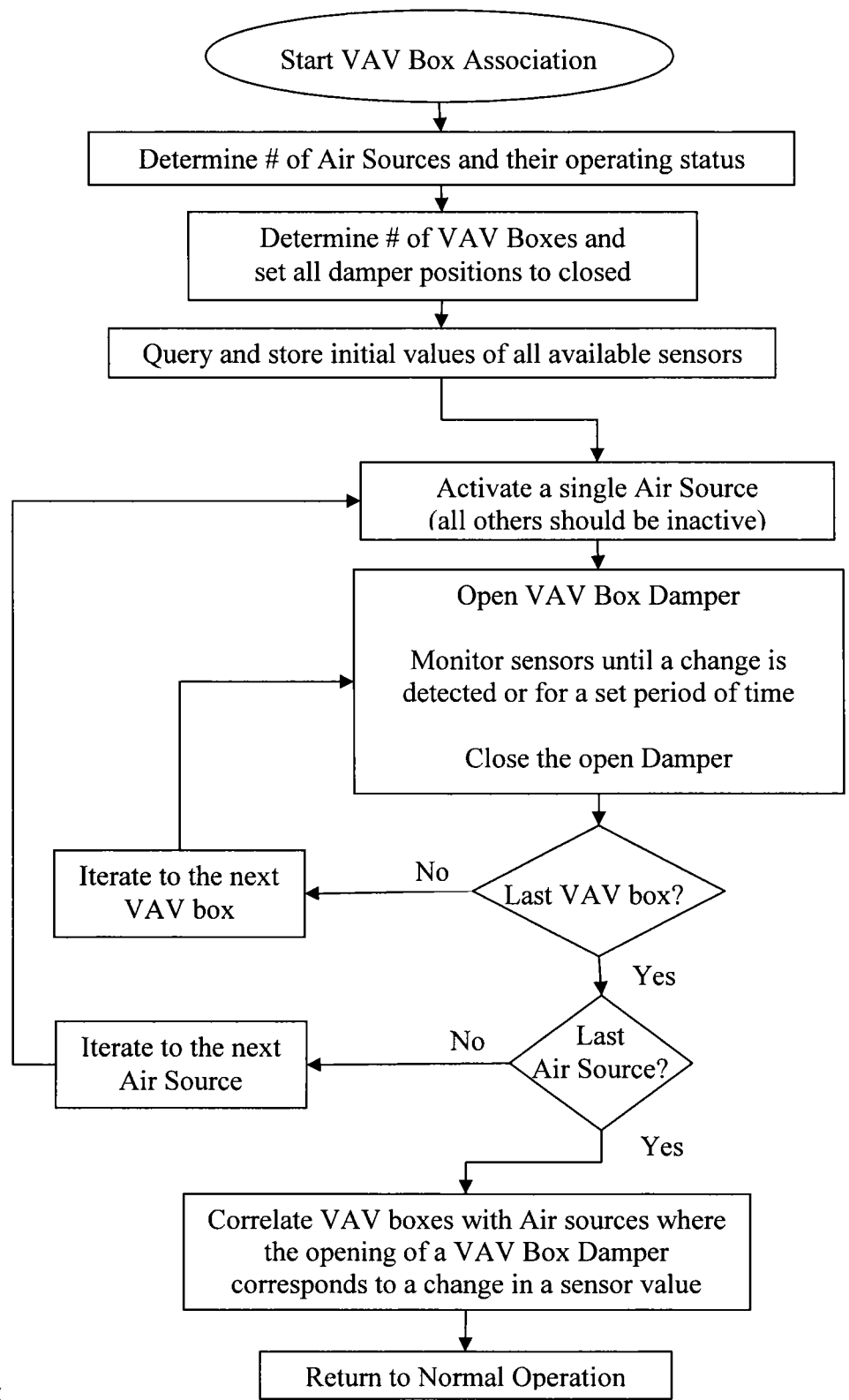
FIG. 5 is a flow diagram of an exemplary embodiment of VAV box association.

FIG. 5 depicts a flow diagram of an exemplary processes for associating multiple VAV boxes with one or more air sources by iterating through each air source and each VAV box damper position and monitoring the various sensors connected to the system. When the system has iterated through each of the possible air source and VAV box settings the results of the sensor reading changes are analyzed for correlations between individual sensors and specific air source and VAV box configurations. In the case where the opening of a single VAV box damper correlates directly with sensor changes in the VAV box, or a monitor located in a space with a hard association to the VAV box, and this change was only detected when a single air source was active the system can definitively associate the VAV box with the single active air source.

Figure 6:
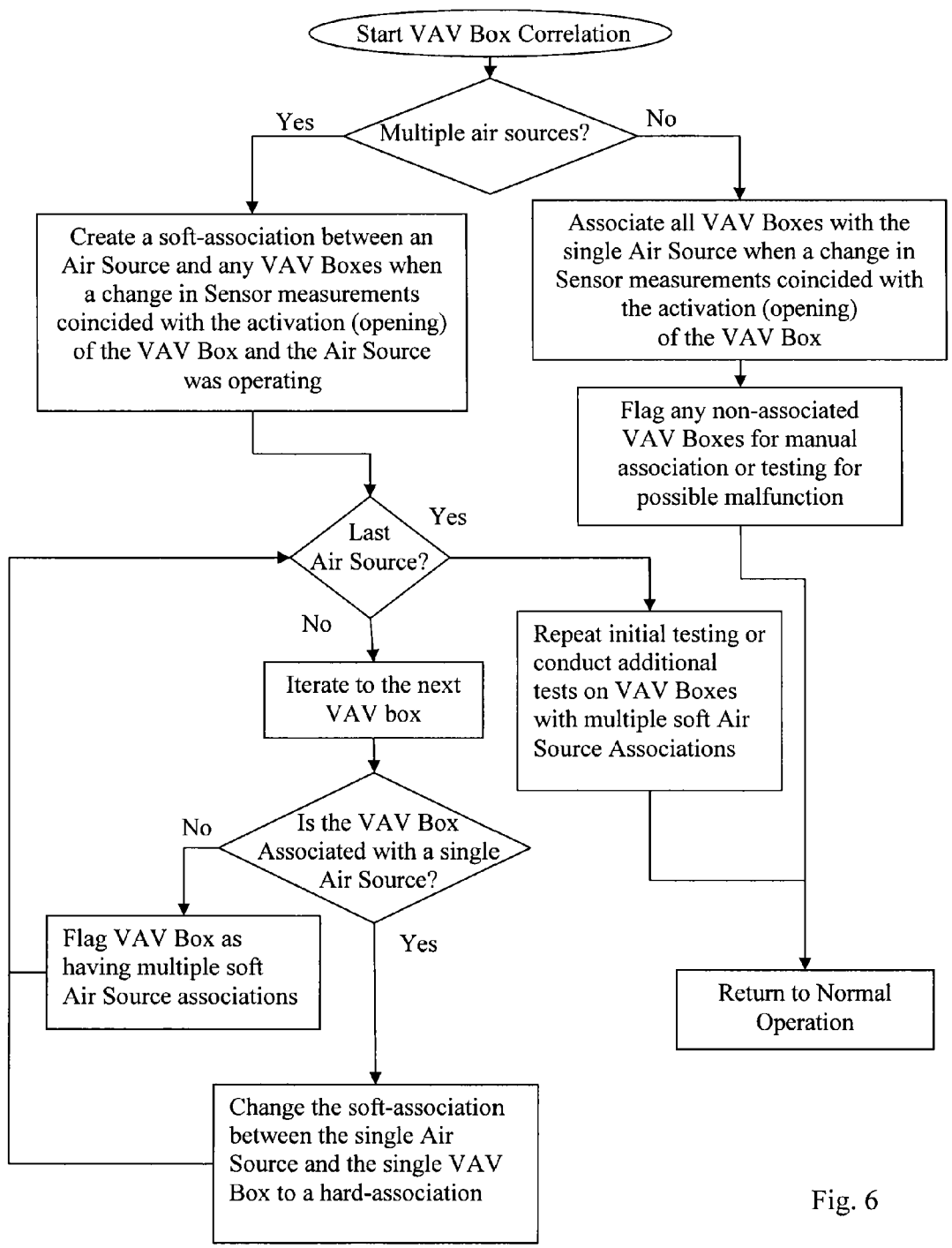
FIG. 6 is a flow diagram of an exemplary embodiment of VAV box correlation.

FIG. 6 depicts a flow diagram of an exemplary processes for correlating individual VAV boxes with one or more air sources. In the case where only a single air source is present in the system all VAV boxes whose activation corresponded to a change in sensor readings are associated with the air source. Any VAV boxes that did not correlate to a change in sensor readings are flagged for further testing, manual association, or inspection for possible equipment malfunction. When there are multiple air-sources present in the system, a soft association is made between any VAV box whose activation corresponded with a change in a sensor reading and the active air source at the time the VAV box was activated. Once the soft-associations are made a check can be performed to determine if any VAV boxes are only associated with a single air source. A hard-association can be then assigned to any VAV boxes that have only a single air source association. In the case of a VAV box having soft-associations with multiple air sources further testing can optionally be conducted to confirm the configuration.

It will be appreciated by those skilled in the art that the above examples can also be practiced on a new unoccupied building or structure, as well as an existing installation that may be occupied and where a minimum amount of airflow must be maintained to each space served by each individual VAV box. In the situation where an installation is occupied an embodiment of the invention can be adapted to only conduct testing to determine air source and VAV box associations during off-peak hours, or by constraining the VAV box and air source settings to ranges that will produce sensor detectable condition variances without subjecting the occupants of a space to an unacceptable environment.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention. It is manifestly intended that this invention be limited only by the following claims and equivalents thereof.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

All of the patents and patent applications disclosed herein, including those set forth in the Background of the Invention, are hereby incorporated by reference. Any incorporation by reference of documents above is limited such that no subject matter is incorporated that is contrary to the explicit disclosure herein. Any incorporation by reference of non-priority documents above is further limited such that no claims included in the documents are incorporated by reference herein and any definitions provided in the documents are not incorporated by reference herein unless expressly included herein.

What is claimed is:

1. A computerized method of determining which of a plurality of variable air-volume boxes are physically associated with a space in a structure, the method comprising:
   communicatively coupling each of the plurality of variable air-volume boxes to a building automation system controller, wherein the building automation system controller is configured to independently actuate a damper operably coupled to each of the plurality of variable air-volume boxes;
   communicatively coupling a sensor proximate to each of the plurality of variable-air-volume boxes with the building automation system controller, wherein building automation system controller is configured to receive a data sample from the sensor;
   causing the building automation system controller to record a pre-baseline data sample from each sensor before the damper operably coupled to the one of the plurality of variable air-volume boxes corresponding to the sensor has been actuated;
   causing the building automation system controller to actuate the damper operably coupled to at least one of the plurality of variable air-volume boxes;

causing the building automation system controller to record a baseline data sample from each sensor after the damper operably coupled to the one of the plurality of variable air-volume boxes corresponding to the sensor has been actuated; and causing the building automation system controller to correlate the baseline data sample with the pre-baseline data sample to determine which of the plurality of variable air-volume boxes are physically associated with the space in the structure, and, in response, causing the building automation system controller to record the association of the space with the individual one of the plurality of variable air-volume boxes.

2. The computerized method of claim 1, wherein causing the building automation system controller to record and causing the building automation system controller to actuate the damper respectively comprises:

causing the building automation system controller to actuate the damper operably coupled to each of the plurality of variable air-volume boxes to a fully-closed position;

causing the building automation system controller to record the pre-baseline data sample from each sensor after the damper operably coupled to each of the plurality of variable air-volume boxes have been actuated to the fully-closed position;

causing the building automation system controller to actuate the damper operably coupled to a first variable air-volume box to a fully-open position;

causing the building automation system controller to record a first baseline data sample from each sensor after the damper operably coupled to the first variable air-volume box has been actuated to the fully-open position;

causing the building automation system controller to actuate the damper operably coupled to a second variable air-volume box to the fully-open position; and causing the building automation system controller to record a second baseline data sample from each sensor after the damper operably coupled to the second variable air-volume box has been actuated to the fully-open position.

3. The computerized method of claim 1, wherein the sensor is configured to detect a change in temperature.

4. The computerized method of claim 1, wherein causing the building automation system controller to record and causing the building automation system controller to actuate the damper respectively comprises:

causing the building automation system controller to actuate the damper operably coupled to each of the plurality of variable air-volume boxes to a fully-closed position;

causing the building automation system controller to record the pre-baseline data sample from each sensor after the dampers operably coupled to each of the plurality of variable air-volume boxes have been actuated to the fully-closed position;

causing the building automation system controller to actuate the damper operably coupled to a first variable air-volume box to a half-open position;

causing the building automation system controller to record a first baseline data sample from each sensor after the damper operably coupled to the first variable air-volume box has been actuated to the half-open position;

causing the building automation system controller to actuate the damper operably coupled to the first variable air-volume box to the fully-closed position;

causing the building automation system controller to actuate the damper operably coupled to a second variable air-volume box to the half-open position; and causing the building automation system controller to record a second baseline data sample from each sensor after the damper operably coupled to the second variable air-volume box has been actuated to the half-open position.

5. The computerized method of claim 4, further comprising:

causing the building automation system controller to analyze the first and second baseline data samples to determine if the first and second baseline condition data samples are substantially identical;

causing the building automation system controller to actuate the damper operably coupled to each of the first and second variable air-volume boxes to the half-open position;

causing the building automation system controller to record a third baseline data sample from each sensor proximate to each of the plurality of variable air-volume boxes after the dampers operably coupled to the first and second variable air-volume boxes have been actuated to the half-open position; and causing the building automation system controller to correlate the first and second baseline data samples with the third baseline data samples to determine if the first and second variable air-volume boxes are physically associated with the space in the structure, and, in response, causing the building automation system controller to record in the non-transient computer storage readable medium the association of the space with the first and second variable air-volume boxes for subsequent use by the building automation system to actuate the damper operably coupled to each of the first and second variable air-volume boxes.

6. The computerized method of claim 4, wherein the sensor is configured to detect a change in air pressure.

7. The computerized method of claim 4, wherein the sensor is configured to detect a change in air flow rate.

8. A building automation system (BAS) configured to determine which of a plurality of variable air-volume boxes are physically associated with a space in a structure, the system comprising:

a plurality of variable air-volume boxes, each of the plurality of variable air-volume boxes respectively operably coupled to an individual damper of a plurality of dampers, the damper configured to adjust a flow of air into an adjacent space, wherein the damper is operably coupled to an individual programmable logic controller of a plurality of programmable logic controllers, the individual programmable logic controller configured to actuate the damper;

a sensor positioned proximate to each of the plurality of variable air-volume boxes;

an environmental sensor positioned external to the space and communicatively coupled to the building automation system controller; and a building automation system controller communicatively coupled to each of the programmable logic controllers, each of the sensors, and the environmental sensor, wherein the programmable logic controllers respectively provide an interface to the building automation system controller such that each damper can be actuated.

9. The building automation system of claim 8, wherein the sensor is configured to detect airflow.

10. The building automation system of claim 8, wherein the sensor is configured to detect pressure in a duct connected to one of the plurality of variable air-volume box.

11. The building automation system of claim 8, wherein the environmental sensor is at least one of a thermostat, a humidity sensor, an air-pressure sensor, or a light sensor.

12. The building automation system of claim 8, further comprising:
at least two variable speed air-sources coupled to the plurality of variable air-volume boxes, wherein the building automation system controller is communicatively coupled to an air-source controller operably coupled to one of the at least two variable speed air-sources, wherein the air-source controller provides an interface to the building automation system controller such that the speed of the air-source can be adjusted.

13. A computerized method of determining which of a plurality of variable air-volume boxes are physically associated with a space in a structure, the method comprising:
communicatively coupling a building automation system to a building automation system controller;
communicatively coupling each of the plurality of variable air-volume boxes to the building automation system controller, wherein the building automation system controller is configured to independently actuate a damper operably coupled to each of the variable air-volume boxes;
communicatively coupling a sensor proximate to each of the plurality of variable-air-volume boxes to the building automation system controller;
communicatively coupling an environmental sensor positioned external to the space to the building automation system controller;
causing the building automation system controller to actuate the damper operably coupled to at least one of the plurality of variable air-volume boxes;
causing the building automation system controller to record a baseline data sample from each sensor and the environmental sensor before and after the damper operably coupled to the at least one of the plurality of variable air-volume boxes corresponding to the sensor proximate to each of the plurality of variable air-volume boxes has been actuated; and
causing the building automation system controller to correlate the baseline data sample with the actuation of the damper by the controller to determine which of the plurality of variable air-volume boxes are physically associated with the space, and, in response, causing the building automation system controller to record the association of the space with an individual one of the variable air-volume boxes for subsequent use by the building automation system to actuate the damper operably coupled to the individual one of the variable air-volume boxes.

14. The computerized method of claim 13, further comprising:
communicatively coupling at least two variable speed air sources to a building automation system;
communicatively coupling each of the at least two variable speed air sources to an air-source controller, wherein the air-source controller is configured to adjust the speed of the at least two variable speed air sources;
communicatively coupling the air-source controller to the building automation system controller, wherein the building automation system controller is configured to adjust the air speed of the at least two variable speed air sources via the air-source controller;
causing the building automation system controller to activate each of the at least two air sources;
causing the building automation system controller to record the baseline data sample from each sensor and the environmental sensor before and after the air-source controller has been actuated; and
causing the building automation system controller to correlate the baseline data sample with the actuation of the air-source controller to determine which of the at least two variable speed air sources are physically associated with an individual one of the variable air-volume boxes, and, in response, causing the building automation system controller to record the association of an individual one of the at least two variable speed air sources with the individual one of the variable air-volume boxes for subsequent use by the building automation system to actuate the air-source controller.

15. The computerized method of claim 13, wherein the sensor proximate to each of the plurality of variable air-volume boxes is configured to detect a change in air pressure.

16. The computerized method of claim 13, wherein the sensor proximate to each of the plurality of variable air-volume boxes is configured to detect a change in air flow rate.

* * * * *